United States Patent [19]
Belliveau

[11] Patent Number: 4,750,384
[45] Date of Patent: Jun. 14, 1988

[54] OVERDRIVE TRANSMISSION UNIT

[75] Inventor: Norman R. Belliveau, Anderson, Calif.

[73] Assignee: American Overdrive, Inc., Redding, Calif.

[21] Appl. No.: 923,137

[22] Filed: Oct. 24, 1986

[51] Int. Cl.⁴ ............................................. F16H 57/10
[52] U.S. Cl. ..................................... 74/783; 74/781 R
[58] Field of Search ..................... 74/781 R, 782, 783, 74/786, 787, 790

[56] References Cited

U.S. PATENT DOCUMENTS

| | | | |
|---|---|---|---|
| 2,946,240 | 7/1960 | Kop | 74/781 R X |
| 3,126,765 | 3/1964 | Conkle | 74/781 R |
| 3,128,643 | 4/1964 | Gadd | 74/781 R |
| 3,477,313 | 11/1969 | Ringe | 74/781 R X |
| 3,797,332 | 3/1974 | Cameron et al. | 74/781 R X |
| 4,056,990 | 11/1977 | Hatano | 74/781 R |
| 4,114,478 | 9/1978 | Clauss | 74/781 R |
| 4,178,814 | 12/1979 | Ahlen | 74/781 R |
| 4,328,716 | 5/1982 | Ahlen et al. | 74/781 R X |
| 4,484,494 | 11/1984 | Sakakibara | 74/781 R |

FOREIGN PATENT DOCUMENTS

| | | | |
|---|---|---|---|
| 0613252 | 1/1961 | Canada | 74/781 R |
| 1071897 | 2/1980 | Canada | 74/782 |

*Primary Examiner*—Leslie A. Braun
*Assistant Examiner*—Harold F. Macris
*Attorney, Agent, or Firm*—Leonard D. Schappert

[57] ABSTRACT

An overdrive transmission unit is provided which includes an electrical switch circuit which activates a solenoid to shift gears and which utilizes a planetary gear system and clutch and brake packs to provide an additional gear ratio and which, because of its unique construction, requires minimal axial and lateral space.

5 Claims, 4 Drawing Sheets

OVERDRIVE TRANSMISSION UNIT

BACKGROUND OF THE INVENTION

1. Field of the Invention.

The present invention relates generally to overdrive units for use with automobiles with standard or automatic transmissions and, more specifically, to overdrive transmission units of small size which utilize a planetary gear mechanism in conjunction with clutch packs in order to produce an overdrive transmission unit providing an additional gear ratio for purposes of increasing fuel economy and, in some cases, top speeds of a vehicle. In the past, the use of multiple clutch packs to accomplish the control of the planetary transmission mechanism required a significant amount of axial space within the transmission, as well as a large diameter which, in some circumstances, limited the use of the overdrive transmission unit to specific automobiles, or required modification of an automobile prior to installation.

2. Description of the Prior Art.

In attempts to build a satisfactory overdrive transmission unit, inventors in the past have addressed their efforts to techniques of reducing the amount of space required, techniques to ensure smooth engagement of the gearing, and techniques of timing the change from direct drive to overdrive. While control systems for use with overdrive units have been proposed, most of these systems, have required manual shifting of a lever which either physically controlled an overdrive valve or controlled an electronic circuit which controlled the overdrive valve. Other automatic overdrive units have taught installation of the automatic overdrive unit by rigid connection of its body to the frame of an automobile and installation of the unit mid-range in the drive shaft of the automobile or attachment of the unit to the differential.

None of the prior art of which applicant is aware has taught an automatic overdrive transmission unit which sufficiently reduces both the diameter and the axial space required for installation to make the unit usable, as is the present invention, in the majority of automobiles without modification to the body or frame of the automobile.

SUMMARY OF THE INVENTION

A major object of the present invention is to provide an overdrive transmission unit which may easily be retrofitted to existing automobiles to increase efficiency in fuel usage.

Another object of the present invention is to provide an overdrive transmission unit which retrofits to automatic transmissions and, with minor modifications and the addition of a pump, retrofits to automobiles with manual transmissions.

Another object of the present invention is to provide a compact overdrive transmission unit, thereby facilitating installation in a broader range of automobiles and trucks than has been possible with other devices.

A further object of the present invention is to provide an overdrive transmission unit which includes an electrical circuit which enables the overdrive unit to be shifted through the use of a switch.

The foregoing objects, as well as other objects and benefits of the present invention, are made more apparent by the descriptions and claims which follow.

DESCRIPTION OF THE PREFERRED EMBODIMENT

Figure 1:
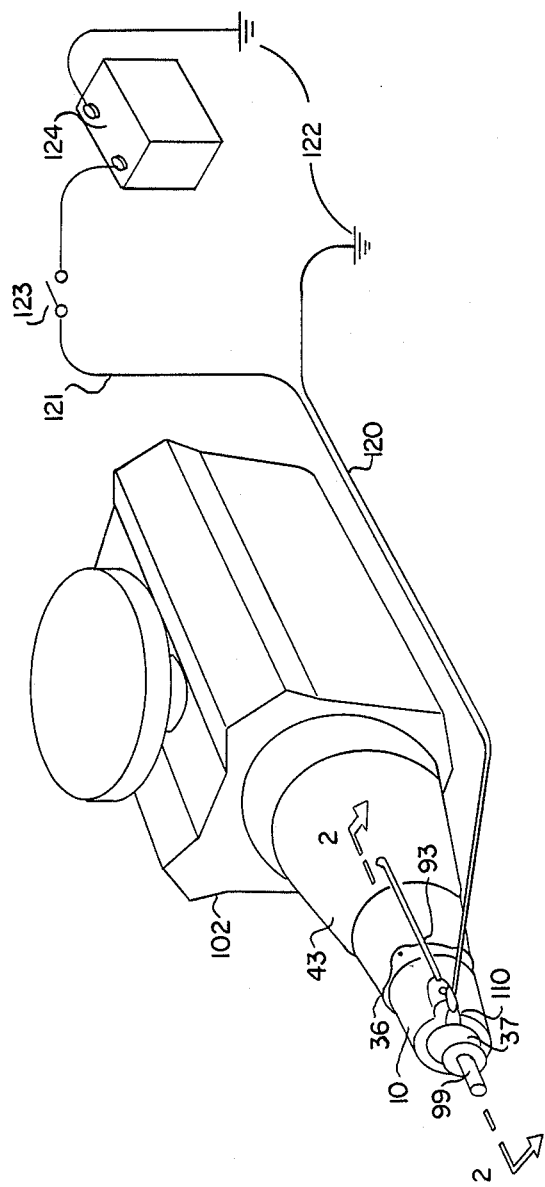
FIG. 1 is a perspective view showing the overdrive transmission unit attached to an automatic transmission which is attached to an automobile engine, and further showing the connection of the oil-pressure passage between the overdrive transmission unit and the automatic transmission.

FIG. 1 shows the overdrive transmission unit 10 coupled to automatic transmission 43 and held in place by adapter plate 36, further showing automatic transmission 43 coupled to automobile engine 102. The original tail housing 37 utilized with automatic transmission 43 is shown attached to the overdrive transmission unit 10. Overdrive output shaft 99 is shown and is adapted to couple to the drive shaft of the automobile in which it is installed. An oil line 93 provides oil pressure from automatic transmission 43 to overdrive transmission unit 10. Overdrive transmission unit 10 is activated by a solenoid 110 by means of an electrical circuit consisting of a battery 124, one terminal of which is a grounded terminal 122 and the other terminal of which supplies power to the solenoid through switch 123 and line 121. Grounding of the solenoid is shown as line 120, completing the circuit. When switch 123 is closed, power is routed through line 121 to solenoid 110, activating overdrive transmission unit 10 into an overdrive condition.

Figure 2:
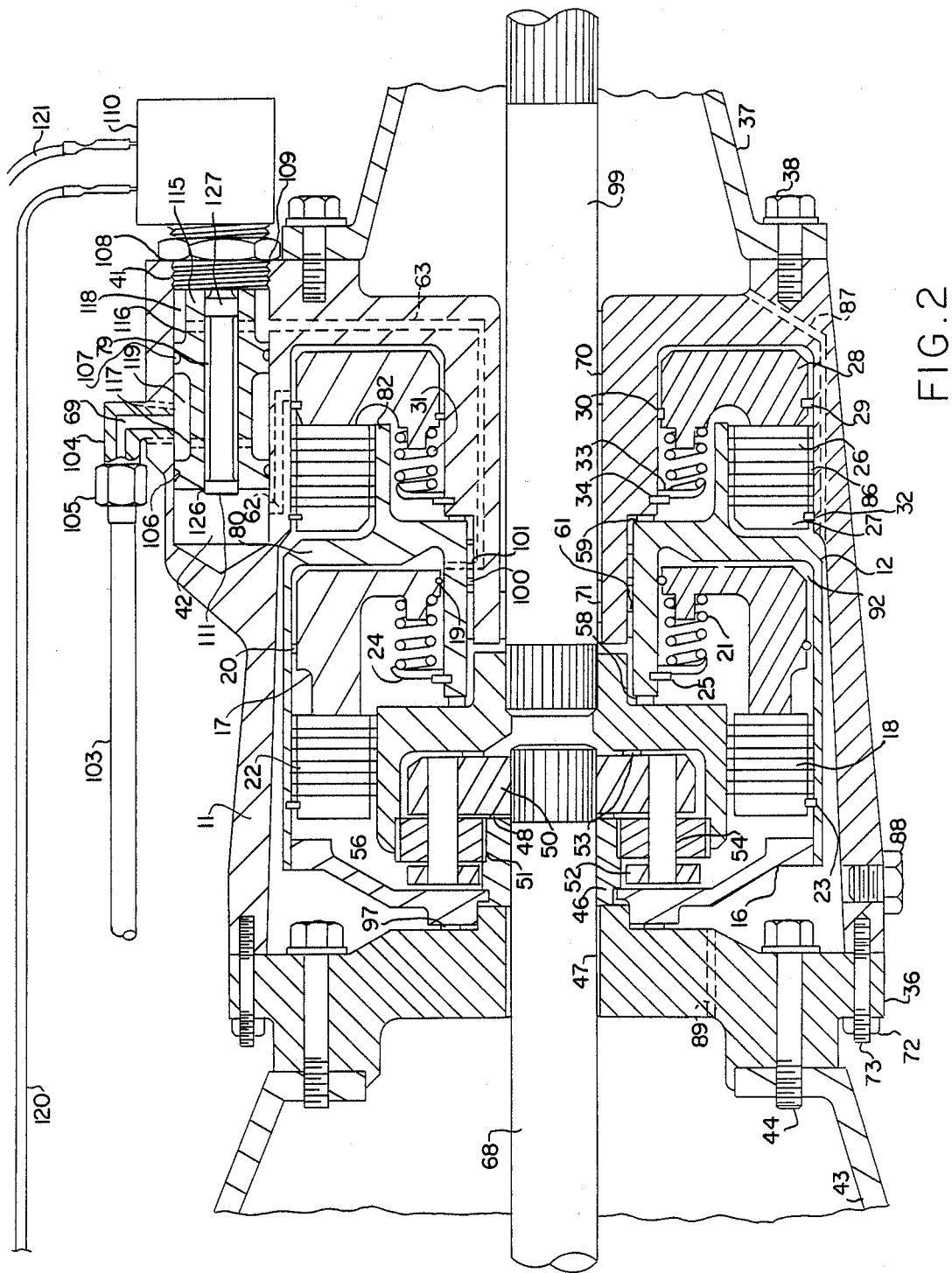
FIG. 2 is a cross-sectional view of the overdrive transmission unit taken along lines 2—2 of FIG. 1.

FIG. 2 is a cross-section of the overdrive transmission unit 10 taken along lines 2—2 of FIG. 1. Overdrive transmission case 11 is attached to adapter plate 36 by studs 73 and nuts 72. Adapter plate 36 is attached to automatic transmission case 43 by bolts 44. Overdrive transmission case 11 is attached to original tail housing 37 by bolts 38. Transmission tail shaft 68 is splined to planetary carrier 50, thereby turning planetary carrier 50 and 52. Planetary gear thrust bearing 53 is provided for support of planetary carrier 50. Planetary gears 51 turn on pins 54. Sun gear 46 engages planetary gears 51, and is held in place by bushings 47. Sun gear 46 is splined to direct drive lug ring 16, which is splined to direct drive drum 12. Thrust bearing 97 is provided to absorb the thrust of direct drive lug ring 16. Thrust bearing 48 is provided to absorb the rearward thrust of sun gear 46. Output ring gear 56 engages planetary gears 51, and is further splined to output shaft 99. Rearward thrust of output ring gear 56 is absorbed by thrust bearing 58. Output shaft 99 is supported by bushings 70 and 71. Direct drive clutch pack 18 is provided, and its individual plates are alternately lugged to output ring gear 56 and to direct drive drum 12. Rearward thrust of direct drive drum 12 is absorbed by thrust bearing 59, and bushing 61 is provided as bearing support to direct drive drum 12. When oil pressure is supplied to direct drive clutch piston 17, direct drive clutch pack 18 is compressed against direct drive clutch pressure plate 22, thereby activating the direct drive mode of the overdrive transmission unit 10. Seals 19 and 20 provide an hydraulic seal when oil pressure is applied to direct drive clutch piston 17. When no oil pressure is applied, direct drive clutch piston 17 is held in an inactive position by direct drive clutch piston return springs 21, which are held in place by direct drive spring retainers 24. Snap ring 23 prevents direct drive clutch pressure plate 22 from moving axially, and snap ring 25 holds direct drive spring retainer 24 in place. Overdrive brake 26, which consists of a clutch pack, is provided, and its individual plates are alternately lugged to automatic overdrive transmission case 11 by locking grooves 86, and to extension 82 of direct drive drum 12. When oil pressure is applied to overdrive brake piston 28, overdrive brake 26 compresses against overdrive brake pressure plate 27, thereby activating the overdrive condition of the overdrive transmission unit 10. Seals 29 and 30 provide an hydraulic seal when oil pressure is applied to overdrive brake piston 28. When no oil pressure is applied, overdrive brake piston 28 is held in an inactive position by overdrive brake piston return springs 31, which are held in place by overdrive spring retainers 33. Snap ring 32 prevents overdrive brake pressure plate 27 from moving axially, and snap ring 34 holds overdrive spring retainer 33 in place. Valve bore 42 is designed to accept an electrically controlled oil valve which routes oil either from hydraulic pressure port 69 to overdrive oil passage 62, or to direct drive oil passage 63. Threads 41 are provided to facilitate the mounting of the oil valve assembly, and seal 109 is provided to eliminate oil leakage. Nut 108 holds solenoid 110 and the valve assembly in position. This is the valve that is activated and deactivated electrically by the driver. More specifically, the valve consists of a valve body 115 having relieved areas 118 and 119, holes 116 and 117 and a hole 79 into which pintle 111 fits. Seals 106 and 107 are provided to restrict oil movement between relieved areas 118 and 119 and valve bore 42. Pintle 111 has two enlarged sections 126 and 127 which act as seals to control the flow of oil. Pintle 111 is connected to solenoid 110 so that its position shifts laterally when solenoid 110 is activated. Solenoid 110 is electrically controlled by switch 123 through electrical lines 120 and 121. Oil is routed from transmission 43 through oil line 103, fitting 105, nipple 104 and hydraulic pressure port 69 to the valve assembly. Oil drain plug 88 is provided to drain oil, and oil return passage 89 is provided to return excess oil to the transmission 43. Sealing rings 100 and 101 maintain oil pressure at oil passage 63. The direct drive drum 12 is sized both in diameter and axially to allow placement of the planetary gear system, consisting of the sun gear 46, ring gear 56 and planetary gear housing 50 and planetary gears 51, in its interior, in addition to the direct drive clutch system, consisting of direct drive clutch pack 18, direct drive clutch pressure plate 22 and direct drive clutch piston 17 and related parts. Direct drive drum 12 is substantially cylindrical and includes direct drive cylinder 92, in which direct drive clutch piston 17 is positioned. The plates of direct drive clutch pack 18 and direct drive clutch pressure plate 22 have an inner diameter which substantially matches the diameter of ring gear 56 and an outer diameter which substantially matches the diameter of direct drive cylinder 92 to facilitate the placement of the entire planetary gear system completely within the inner diameter of direct drive clutch pack 18 so that the unit's axial space requirements are substantially reduced. Extension 82 of direct drive drum 12 is substantially cylindrical and is so positioned and of a diameter sufficiently smaller than that of the direct drive cylinder 92 that it facilitates use of an overdrive brake pack 26 of a size sufficiently small that the outer diameter of brake pack 26 is substantially the same as or less than the diameter of direct drive drum 12. The diameter of extension 82 is such that it substantially matches the inner diameter of the clutch plates utilized in overdrive brake pack 26 so that alternate clutch plates of overdrive brake pack 26 are lugged to extension 82 of direct drive drum 12. As a result of the positioning and placement of components inside direct drive drum 12 and the extension 82 of direct drive drum 12, an assembled overdrive unit of considerably smaller diameter and of considerably less axial length than is otherwise available is produced.

Figure 3:
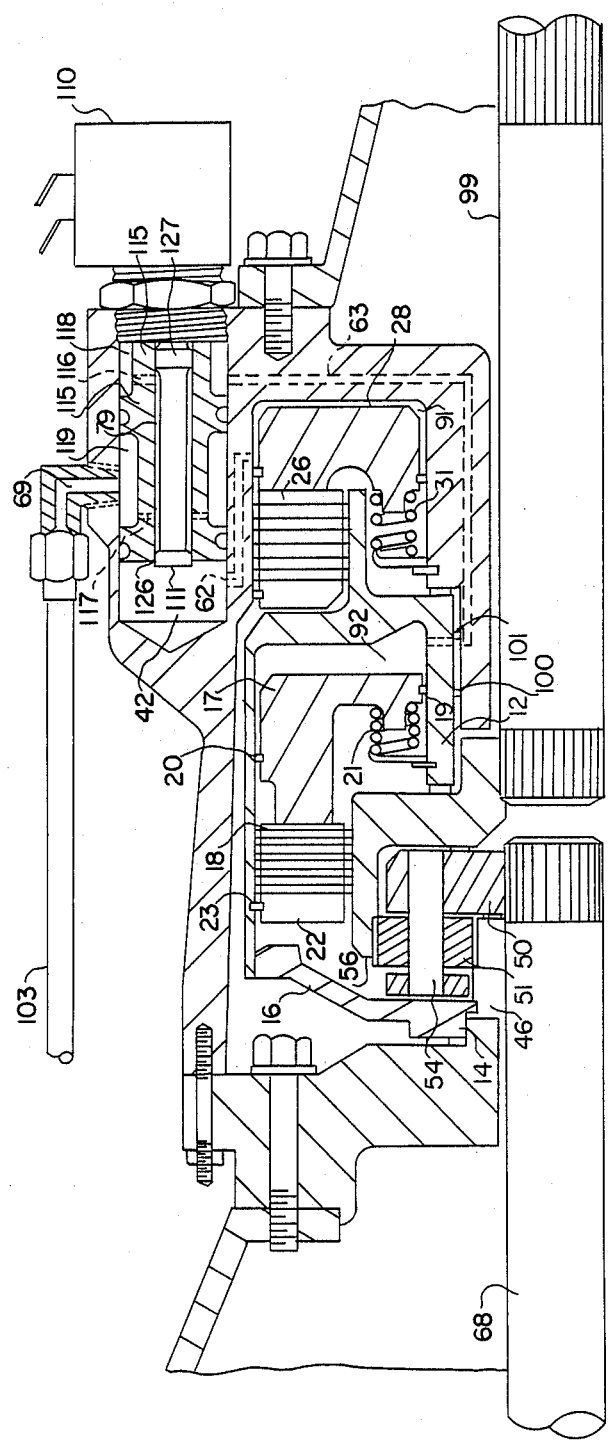
FIG. 3 is a cross-sectional view of the upper half of FIG. 2 showing the positioning of the internal parts of the overdrive transmission unit when the unit is in direct drive condition.

FIG. 3 shows the direct drive condition of overdrive transmission unit 10 with switch 123 turned off. Pintle 111 of the oil valve assumes the position shown in FIG. 3 and is held in that position by solenoid 110. When the pintle 111 is in the position shown in FIG. 3 and the overdrive transmission unit 10 is in direct drive condition, oil travels through oil line 103 to hydraulic pressure port 69 to recessed area 119, through hole 117 to bore 79, through hole 116 to recessed area 118 and through direct drive oil passage 63 to direct drive cylinder 92, and activates direct drive clutch piston 17, which compresses direct drive clutch pack 18 against direct drive clutch pressure plate 22. Direct drive clutch pack 18 consists of a series of clutch plates which are lugged alternately to direct drive drum 12 and to output ring gear 56. When the unit is in the direct drive condition, the drive path is from transmission tail shaft 68 to planetary gear housing 50, to planetary gears 51, to sun gear 46, to direct drive lug ring 16, to direct drive drum 12, through direct drive clutch pack 18, to output ring gear 56, to output shaft 99.

Figure 4:
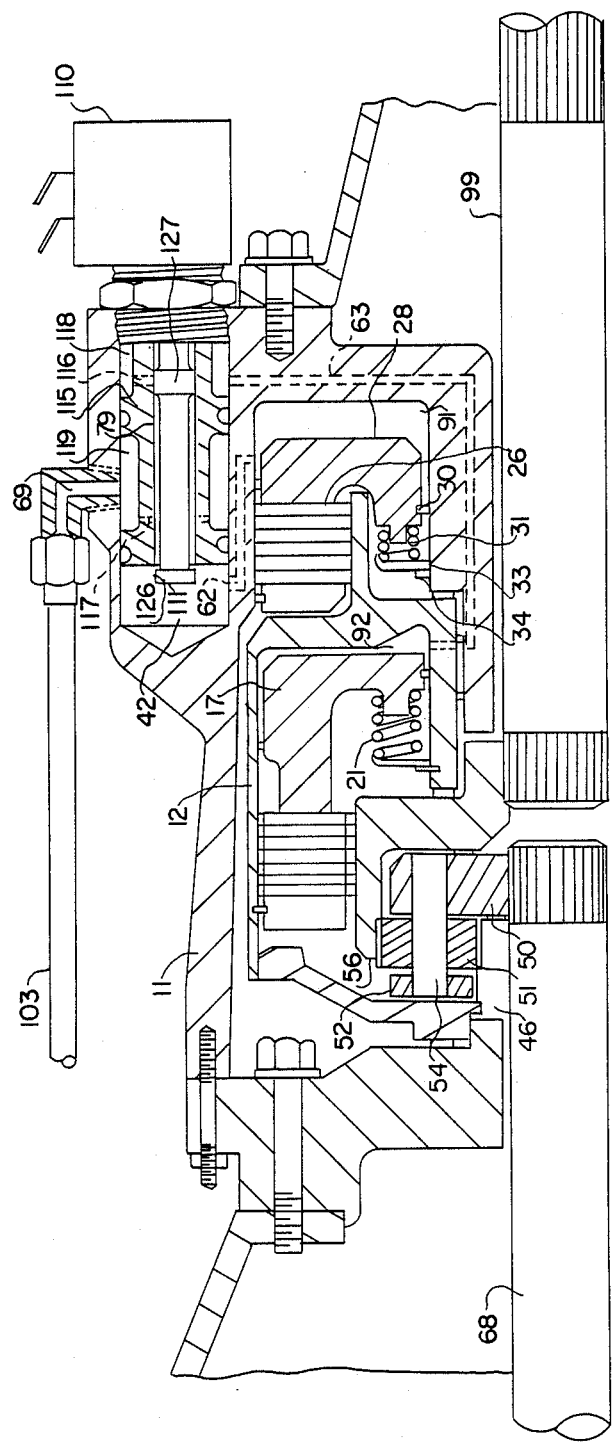
FIG. 4 is a cross-sectional view of the top portion of FIG. 3 showing the position of the individual parts of the overdrive transmission unit when the unit is in an overdrive condition.

FIG. 4 shows the overdrive transmission unit 10 in an overdrive condition. When the driver turns switch 123 on, solenoid 110 activates, pushing and holding pintle 111 in position as shown in FIG. 4. With pintle 111 in position as shown in FIG. 4, oil is routed through oil line 103 to hydraulic pressure port 69 into recessed area 119, through hole 117 into bore 79, into valve bore 42 and through overdrive oil passage 62 to overdrive cylinder 91, creating pressure against overdrive brake piston 28. When overdrive brake piston 28 is activated, overdrive brake pack 26, which consists of a series of clutch plates which are lugged alternately to the overdrive transmission case 11 and to direct drive drum 12, causes direct drive drum 12 to cease rotation. This further locks direct drive lug ring 16, which is directly splined to sun gear 46, thereby activating the overdrive condition in the combination of sun gear 46, planetary gears 51 and output ring gear 56. When the unit is in this condition, the drive path is from transmission tail shaft 68 to planetary gear housing 50, to planetary gears 51, to output ring gear 56, to overdrive output shaft 99.

With the addition of a pressure pump and oil reservoir and the use of adapter plates or modification of the overdrive transmission case 11, the overdrive transmission unit 10 may be used in conjunction with standard-transmission automobiles.

While the foregoing description of the invention has shown a preferred embodiment using specific terms, such description is presented for illustrative purposes only. It is applicant's intention that changes and variations may be made without departure from the spirit or scope of the following claims, and this disclosure is not intended to limit applicant's protection in any way.

I claim:

1. An overdrive transmission unit, comprising:
   a housing having a substantially cylindrical cavity therein;
   a drive drum constructed of a unitary piece of material positioned inside said substantially cylindrical cavity of said housing, having:
      a substantially cylindrical section with an inner diameter;
      a wall bounding one end of said substantially cylindrical section;
      a first substantially cylindrical extension extending outward from said wall opposite said substantially cylindrical section and having an outer diameter substantially smaller than said inner diameter of said substantially cylindrical section;
      a second substantially cylindrical extension extending outward from said wall in the same direction as said substantially cylindrical section, having an outer diameter smaller than said inner diameter of said substantially cylindrical section and said diameter of said first substantially cylindrical extension, and
      an axial length;
   a planetary gear system substantially enclosed within said inner diameter of said substantially cylindrical section of said substantially cylindrical drive drum and within said axial length of said substantially cylindrical drive drum and consisting substantially of:
      a planetary gear carrier rotatably supporting at least one planetary gear;
      a sun gear which engages said planetary gear and said substantially cylindrical drive drum, and
      a ring gear which engages said planetary gear, having a diameter substantially smaller than said inner diameter of said substantially cylindrical section of said substantially cylindrical drive drum;
   a clutch pack consisting of a clutch pressure plate and at least two clutch plates having an inner diameter substantially the same as said diameter of said ring gear and an outer diameter substantially the same as said inner diameter of said substantially cylindrical section of said substantially cylindrical drive drum, said clutch plates being lugged alternately to said inner diameter of said substantially cylindrical section of said substantially cylindrical drive drum and said diameter of said ring gear;
   first compression means for compressing said clutch pack substantially enclosed within said inner diameter of said substantially cylindrical section of said substantially cylindrical drive drum and within said axial length of said substantially cylindrical drive drum;
   a brake substantially enclosed within said substantially cylindrical cavity of said housing, having a clutch pressure plate and at least two clutch plates, at least one of which engages said housing or means substantially stationary with respect to said housing and at least one of which engages said first substantially cylindrical extension of said drive drum, and
   second compression means for compressing said clutch plates of said brake.

2. The invention of claim 1, including a first shaft connected to said planetary gear carrier and a second shaft connected to said ring gear.

3. The invention of claim 1, wherein:
   said first compression means consists substantially of a first cylinder, a first hydraulically operated piston inside said first cylinder and means for supplying pressurized fluid to said first cylinder to operate said first hydraulically operated piston, thereby compressing said clutch plates of said clutch pack, and
   said second compression means consists substantially of a second cylinder, a second hydraulically operated piston inside said second cylinder and means for supplying pressurized fluid to said second cylinder to operate said second hydraulically operated piston, thereby compressing said clutch plates of said brake.

4. The invention of claim 3, wherein said housing has a substantially cylindrical bore for accepting a valve, a first hole for routing fluid to said bore, a second hole for routing fluid from said bore to said first cylinder and a third hole for routing fluid from said bore to said second cylinder, and including a multi-position valve placed in said bore whereby fluid is routed from said first hole to said second hole when said multi-position valve is in a first position and from said first hole to said third hole when said multi-position valve is in a second position.

5. The invention of claim 4, including activating means for changing the position of said multi-position valve from a remote location.

* * * * *